(12) United States Patent
Patel (10) Patent No.: US 11,914,766 B2
(45) Date of Patent: *Feb. 27, 2024

(54) ADAPTIVE MULTI-WINDOW CONFIGURATION BASED UPON GAZE TRACKING (71) Applicant: DISNEY ENTERPRISES, INC., Burbank, CA (US)

(72) Inventor: Mehul Patel, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/686,503

(22) Filed: Mar. 4, 2022

(65) Prior Publication Data
US 2022/0187911 A1 Jun. 16, 2022

Related U.S. Application Data (63) Continuation of application No. 14/703,051, filed on May 4, 2015, now Pat. No. 11,269,403.

(51) Int. Cl.
G06F 1/32 (2019.01)
H04N 7/18 (2006.01)
G06F 3/01 (2006.01)
G06F 3/0481 (2022.01)
H04N 21/472 (2011.01)
H04N 21/434 (2011.01)
H04N 21/439 (2011.01)
H04N 21/442 (2011.01)
H04N 21/658 (2011.01)
H04N 21/431 (2011.01)
H04N 21/4223 (2011.01)
H04N 21/6587 (2011.01)

(52) U.S. Cl.
CPC ............ *G06F 3/013* (2013.01); *G06F 3/0481* (2013.01); *H04N 21/4223* (2013.01); *H04N 21/439* (2013.01); *H04N 21/4316* (2013.01); *H04N 21/4347* (2013.01); *H04N 21/44218* (2013.01); *H04N 21/47202* (2013.01); *H04N 21/6581* (2013.01); *H04N 21/6587* (2013.01)

(58) Field of Classification Search
None
See application file for complete search history.

(56) References Cited

U.S. PATENT DOCUMENTS

| 6,437,758 B1 | 8/2002 | Nielsen et al. |
| 6,554,433 B1 * | 4/2003 | Holler .................... G03B 21/00 353/122 |
| 7,120,880 B1 | 10/2006 | Dryer et al. |

(Continued)

*Primary Examiner* — Jordany Nunez
(74) *Attorney, Agent, or Firm* — Dorsey & Whitney LLP (57) ABSTRACT A window in a multi-window display configuration is provided. A gaze of one or more users is directed at the window. The multi-window display configuration has a plurality of windows that are each configured to display corresponding content. Further, a window attribute of the window is modified based upon the gaze. In addition, a request for the content corresponding to the window is sent to a server. The content corresponding to the window is received from the server. The content corresponding to the window is then displayed according to the modified window attribute at the window.

22 Claims, 9 Drawing Sheets (56) References Cited

U.S. PATENT DOCUMENTS

| | | | |
|---|---|---|---|
| 7,284,201 B2 | 10/2007 | Cohen-Solal | |
| 7,899,915 B2* | 3/2011 | Reisman | H04N 21/25825 |
| | | | 709/227 |
| 8,136,040 B2 | 3/2012 | Fleming | |
| 8,184,069 B1 | 5/2012 | Rhodes | |
| 8,484,368 B2 | 7/2013 | Arnaud et al. | |
| 8,493,390 B2* | 7/2013 | Kalinli | H04N 19/115 |
| | | | 345/428 |
| 8,854,447 B2* | 10/2014 | Conness | G06V 40/19 |
| | | | 348/78 |
| 8,966,370 B2 | 2/2015 | Steiner | |
| 8,990,843 B2 | 3/2015 | Karlsson et al. | |
| 9,253,229 B1* | 2/2016 | Strothmann | H04N 21/23439 |
| 9,412,021 B2 | 8/2016 | Biswas et al. | |
| 9,535,559 B2 | 1/2017 | Poornachandran et al. | |
| 9,829,970 B2 | 11/2017 | Ellis et al. | |
| 10,031,577 B2* | 7/2018 | McLean | G06F 3/1454 |
| 10,042,420 B2* | 8/2018 | McLean | G06F 3/165 |
| 10,120,438 B2* | 11/2018 | Osman | G06F 1/325 |
| 10,303,341 B2* | 5/2019 | Mosqueda Mejia | G06F 3/013 |
| 10,807,000 B2* | 10/2020 | Nelson | A63F 13/213 |
| 10,937,220 B2* | 3/2021 | Mitchell | A63F 13/573 |
| 11,263,725 B2* | 3/2022 | Akenine-Moller | G06F 3/013 |
| 2004/0201608 A1 | 10/2004 | Ma et al. | |
| 2006/0037038 A1* | 2/2006 | Buck | G06Q 40/04 |
| | | | 725/9 |
| 2007/0024705 A1 | 2/2007 | Richter et al. | |
| 2009/0307207 A1 | 12/2009 | Murray | |
| 2010/0169792 A1 | 7/2010 | Ascar et al. | |
| 2010/0332667 A1 | 12/2010 | Menchaca et al. | |
| 2011/0304606 A1* | 12/2011 | Walsh | G06F 3/04842 |
| | | | 345/214 |
| 2012/0146891 A1* | 6/2012 | Kalinli | A63F 13/428 |
| | | | 345/156 |
| 2012/0300061 A1* | 11/2012 | Osman | G06F 1/325 |
| | | | 340/436 |
| 2013/0083025 A1* | 4/2013 | Gibson | G06F 3/012 |
| | | | 345/428 |
| 2013/0259312 A1 | 10/2013 | Lyons et al. | |
| 2014/0092006 A1 | 4/2014 | Boelter et al. | |
| 2014/0176684 A1 | 6/2014 | Varela et al. | |
| 2014/0176813 A1* | 6/2014 | Conness | H04N 21/42204 |
| | | | 348/738 |
| 2014/0280749 A1 | 9/2014 | Arana et al. | |
| 2015/0009117 A1* | 1/2015 | Peters | G06F 3/013 |
| | | | 345/156 |
| 2015/0169053 A1* | 6/2015 | Bozarth | G06F 1/3234 |
| | | | 345/156 |
| 2015/0210292 A1* | 7/2015 | George-Svahn | B60W 50/10 |
| | | | 348/148 |
| 2015/0220295 A1* | 8/2015 | Kim | G06F 3/013 |
| | | | 345/156 |
| 2016/0037480 A1* | 2/2016 | Bellamkonda | H04W 12/02 |
| | | | 455/456.2 |
| 2016/0185220 A1* | 6/2016 | Mere | B60K 37/06 |
| | | | 340/438 |
| 2016/0225012 A1* | 8/2016 | Ha | G06Q 30/0277 |
| 2016/0225122 A1 | 8/2016 | Boelter et al. | |
| 2017/0097677 A1* | 4/2017 | McLean | G09G 5/12 |
| 2017/0097678 A1* | 4/2017 | McLean | G06F 3/1423 |
| 2017/0285740 A1* | 10/2017 | Jönsson | G09G 5/26 |
| 2017/0344108 A1* | 11/2017 | Mosqueda Mejia | G06F 3/013 |
| 2019/0138183 A1* | 5/2019 | Rosas | G06F 3/0482 |

* cited by examiner

ADAPTIVE MULTI-WINDOW CONFIGURATION BASED UPON GAZE TRACKING

CROSS REFERENCE TO RELATED APPLICATIONS

This application claims the benefit of priority pursuant to 35 U.S.C. § 120 of U.S. patent application Ser. No. 14/703,051, filed 4 May 2015, entitled "Adaptive Multi-Window Configuration Based Upon Gaze Tracking," which is hereby incorporated by reference herein in its entirety.

BACKGROUND

1. Field

This disclosure generally relates to the field of data content. More particularly, the disclosure relates to the delivery of data content.

2. General Background

Content such as audio and/or video may be sent to computing devices via streaming. The streaming approach allows content to be received by a computing device and played by that computing device during delivery. In other words, a user utilizing a computing device may begin playing the content before the entirety of the content has been received. For example, a user may begin watching the beginning of a video that has been received while the middle and the end of the video are still being delivered.

SUMMARY

A window in a multi-window display configuration is provided. A gaze of one or more users is directed at the window. The multi-window display configuration has a plurality of windows that are each configured to display corresponding content. Further, a window attribute of the window is modified based upon the gaze. In addition, a request for the content corresponding to the window is sent to a server. The content corresponding to the window is received from the server. The content corresponding to the window is then displayed according to the modified window attribute at the window.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A configuration having one or more streaming devices that are in operable communication with a plurality of display windows is provided. The configuration adapts one or more attributes associated with the plurality of display windows based upon tracking the gaze of one or more users. As a result, computing resources can be efficiently allocated to display windows to which the one or more users are focused rather than display windows to which the one or more users are not focused.

Figure 1:
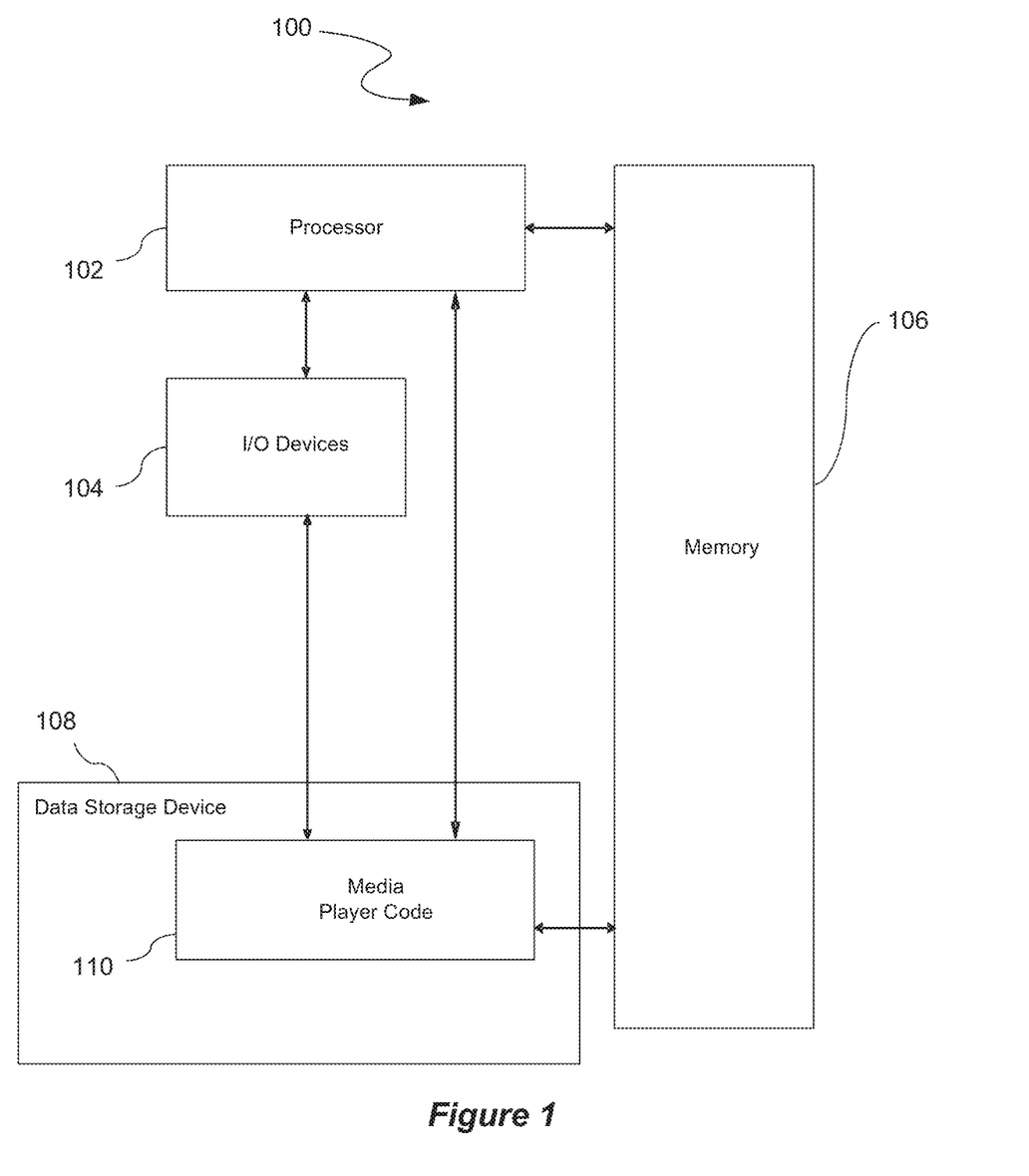
FIG. 1 illustrates a streaming device that is utilized to stream content for one or more devices that each display one or more windows.

FIG. 1 illustrates a streaming device 100 that is utilized to stream content for one or more devices that each display one or more windows. The streaming device 100 may be the device itself that displays the one or more windows, e.g., a laptop. Alternatively, the streaming device 100 may be a device that performs streaming for other devices that perform the display of the one or more windows, e.g., a set top box that streams content to multiple televisions.

As illustrated, the streaming device 100 comprises a processor 102, a memory 106, e.g., random access memory ("RAM") and/or read only memory ("ROM"), a data storage device 108 that stores media player code 110, and various input/output ("I/O") devices 104. The I/O devices 104 may include audio/video inputs, audio/video outputs, display devices, projectors, receivers, transmitters, audio speakers, image capture sensors, user input devices, microphones, etc. In one aspect, the I/O devices 104 are integrated within the streaming device 100, e.g., a tablet device. In another aspect, the I/O devices 104 are not integrated within the streaming device 100, but are in operable communication with the streaming device 100, e.g., multiple televisions that receive streamed content from a set top box.

In one aspect, the data storage device 108 loads the media player code 110 from a computer readable storage device, e.g., a magnetic or optical drive, diskette, or non-volatile memory, DVD, CD-ROM, etc. The media player code 110 is then operated by the processor 102 in the memory 106 of the streaming device 100. In another aspect, the data storage device 108 is the computer readable storage device. In yet another aspect, the media player 110 is stored in the memory 106 rather than the data storage device 108. As such, the media player code 110 and associated data structures of the present disclosure may be stored on a computer readable storage device.

The streaming device 100 may be utilized in various types of configurations, e.g., computing devices, set top boxes, portable devices, etc. Examples of computing devices include, but are not limited to, desktop computers, laptop computers, smartphones, tablet devices, gaming consoles, set top boxes, kiosks, or the like.

For instance, a user may be streaming two distinct videos, e.g., two different sporting events, on two different display windows of the user's laptop computer. The configuration tracks the gaze of the eyes of the user and notifies the user's laptop computer as to which of the display windows the eyes of the user are focused on at a given moment. The user's laptop computer may then modify an attribute of the display window on which the user is focused in a particular manner. For instance, the user's laptop computer may modify an attribute associated with the appearance of the display window on which the user is focused to improve the picture quality of that display window.

The window attribute may be a bit rate at which content is received, dimensions of a display window, location of a display window, audio volume associated with a display window, or content displayed by the display window. The attribute may be modified based not only on whether a gaze of a user is detected as being focused on a display window, but also on whether a gaze of a user is detected as not being focused on a display window. For example, the configuration can increase the dimensions of a display window at which the gaze of the user is detected and decrease the dimensions of a display window at which the gaze of the user is not detected.

A laptop is provided only as an example. A variety of computing devices other than a laptop, e.g., personal computer ("PC"), smartphone, tablet device, set top box, etc., may be utilized by the configuration. Further, the display windows can be generated by a display device in operable communication with the computing device, e.g., a display screen, multiple display screens situated in proximity to each other to stitch together a bigger display screen, or a projection device such as a video projector that projects video onto a surface. The computing device, which streams the content, may have a tracking sensor that determines the gaze of the user for display windows that may or may not be generated by that particular computing device.

Further, the configuration may be utilized to track the gaze of multiple users. The configuration may perform facial recognition on each user and then track the gaze of each identified user. The configuration may then modify one or more attributes of one or more display windows based upon criteria that comprise the gazes of multiple users.

Figure 2:
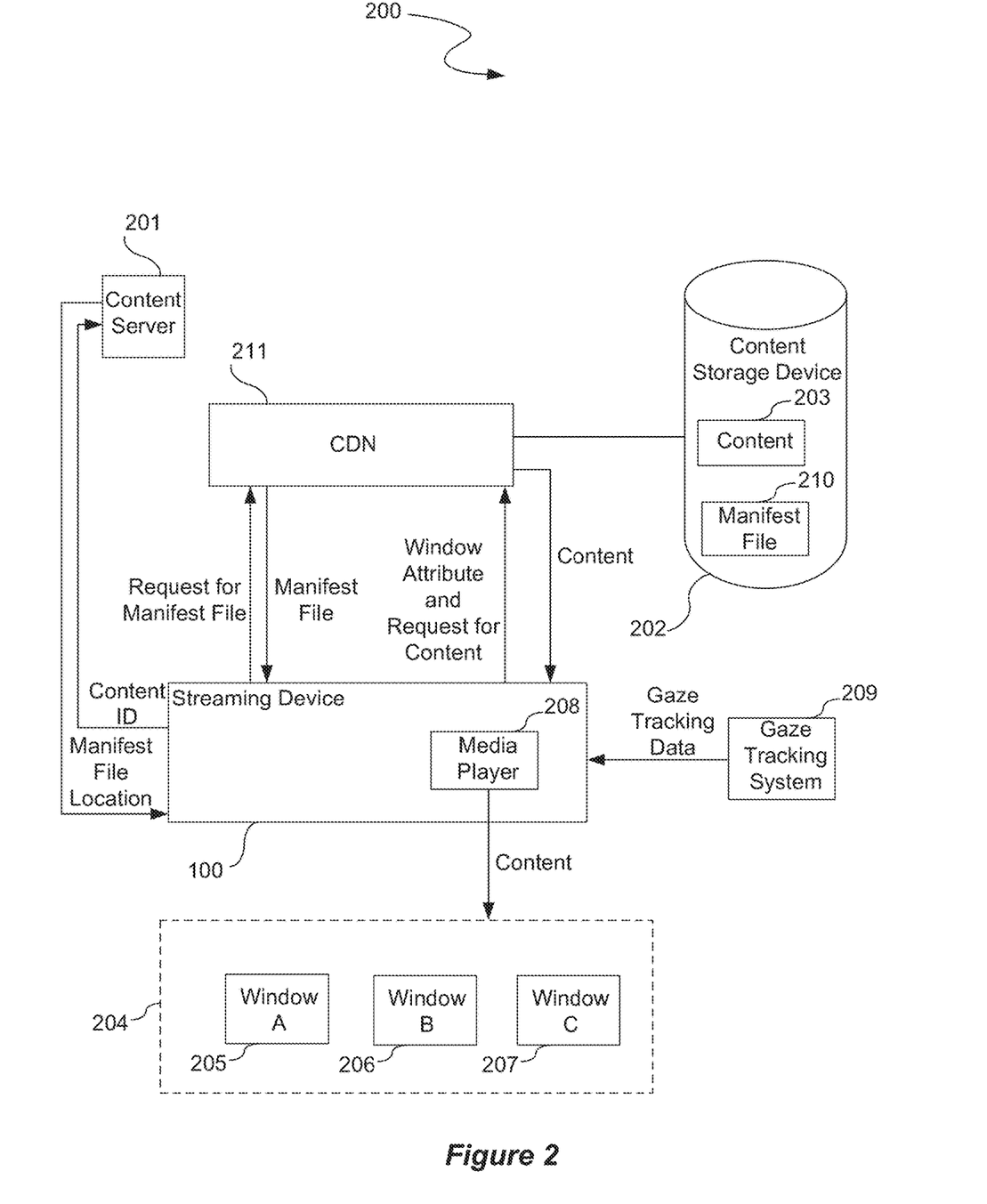
FIG. 2 illustrates an example of an adaptive multi-window streaming system in which the streaming device illustrated in FIG. 1 is used.

FIG. 2 illustrates an example of an adaptive multi-window streaming system 200 in which the streaming device 100 illustrated in FIG. 1 is used. The adaptive multi-window streaming system 200 includes the streaming device 100, a content server 201, a content delivery network 211, a content storage device 202, a multi-window display configuration 204, and a gaze tracking system 209.

The gaze tracking system 209 may be located close to the multi-window display configuration 204, such as directly above or below the multi-window display configuration 204. The gaze tracking system 209 determines the location, e.g., display screen coordinates, in the multi-window display configuration 204 at which the gaze of one or more users is directed. For example, the multi-window display configuration 204 may have windows 205, 206, and 207. The gaze tracking system 209 is used to determine whether one or more users' gaze is directed at the windows 205, 206, or 207. In other words, the gaze tracking system 209 determines which of the windows 205, 206, and 207 is receiving more interest from users than the remainder of the windows 205, 206, and 207.

The gaze tracking system 209 may determine the gaze of the one or more users through a variety of different methodologies. In one aspect, the gaze tracking system 209 is an image capture system that captures images of the eyes of the one or more users. The gaze tracking system 209 may then analyze the images of the eyes of the one or more users with respect to known locations, e.g., coordinates, of the windows 205, 206, and 207. For example, the gaze tracking system 209 determines the direction of the eyes and whether that direction coincides with a known location of one of the windows 205, 206, or 207. The gaze tracking system 209 may then compose such information as gaze tracking data and send the gaze tracking data to the streaming device 100. Alternatively, the streaming device 100 receives the images from the gaze tracking system 209 and analyzes the images to determine the coordinates and compose the gaze tracking data. In another aspect, the gaze tracking system 209 captures images of the head positions of the one or more users for gaze determination. The gaze tracking system 209 may analyze the images to determine the gaze of the one or more users based upon head orientation, e.g., head rotation, head tilt, etc. Alternatively, the streaming device 100 receives the images from the gaze tracking system 209 and performs such analysis.

The streaming device 100 has a media player 208 that is invoked by the processor 102 executing the media player code 110 illustrated in FIG. 1. The media player 208 plays various forms of media such as audio, video, etc. The media player 208 determines that content 203, e.g., a particular movie, should be played based on a user input, an automatic decision by the media player 208, an automatic recommendation generated by a processor, etc. Prior to requesting the content 203, the media player 208 requests a location of a manifest file 210 corresponding to the content 203 from the content server 201. The media player 208 may send a content identifier to the content server 201, so that the content server 201 can retrieve the location corresponding to the manifest file 210. The manifest file 210 lists the available bitrates for the content 203. The bitrates can be for video content, audio content, etc. The content server 201 then sends location data, which indicate the location of a content delivery network ("CDN") 211 that stores the manifest file 210, to the streaming device 100.

The CDN 211 may be a network of computing devices, e.g., server computers, that communicate with each other to provide delivery of the content 203 to the streaming device 100. Alternatively, the CDN 211 may be one server computer. The CDN 211 may be in operable communication e.g., cable connection, wireline network connection, wireless network connection, etc., with the content storage device 202, which stores the content 203 and the manifest file 210. Alternatively, the content storage device 202 may be integrated within the CDN 211 e.g., a disk drive, memory device, etc. Further, multiple content storage devices 202 may be used to store the content 203 and/or the manifest file 210. As yet another alternative, multiple CDN's 211 may be utilized.

The streaming device 100 then sends a request to the CDN 211 for the manifest file. The CDN 211 retrieves the manifest file 210 corresponding to the content 203 from the content storage device 202 and sends the manifest file 210 to the media player 208.

The media player 208 determines its bandwidth availability and selects a corresponding bitrate from the received manifest file 210. Further, the media player 208 may utilize the gaze tracking data received from the gaze tracking system 209 in the selection process. For instance, the media player 208 may have increased or decreased the available bandwidth for a particular window based upon the gaze tracking data received from the gaze tracking system 209.

The media player 208 then generates a request for the content 203 that is sent from the streaming device 100 to the CDN 211. The request may include a time code that indicates a particular portion of the content 203. The time code is determined by the media player 208 based upon a determination of the portion of the content 203 that is being currently consumed by a user. The media player 208 may also send a window attribute, e.g., a video bitrate, an audio bitrate, etc., for the requested content 203 corresponding to a window 205, 206, or 207, with the request for content.

The CDN 211 may then retrieve the version of the content 203 from the content storage device 202, e.g., a database, based upon the particular window attribute, e.g., the selected video bitrate or audio bitrate, received from the media player 208 via the streaming device 201. For example, the window attribute may be a bit rate that is indicative of High Definition ("HD") capability. The CDN 211 then retrieves the version of the content 203 from the content storage device 202 that corresponds to that window attribute. Alternatively, the CDN 211 may retrieve the content 203 from the content storage device 202 without use of a window attribute.

After the CDN 211 obtains the requested content, the CDN 211 then sends the requested content 203 to the media player 208. The media player 208 may then send the requested content 203 to the particular window in the multi-window display configuration 204 that is to be adapted. Different content 203, e.g., different movies, may be displayed on different windows.

Figure 3A:
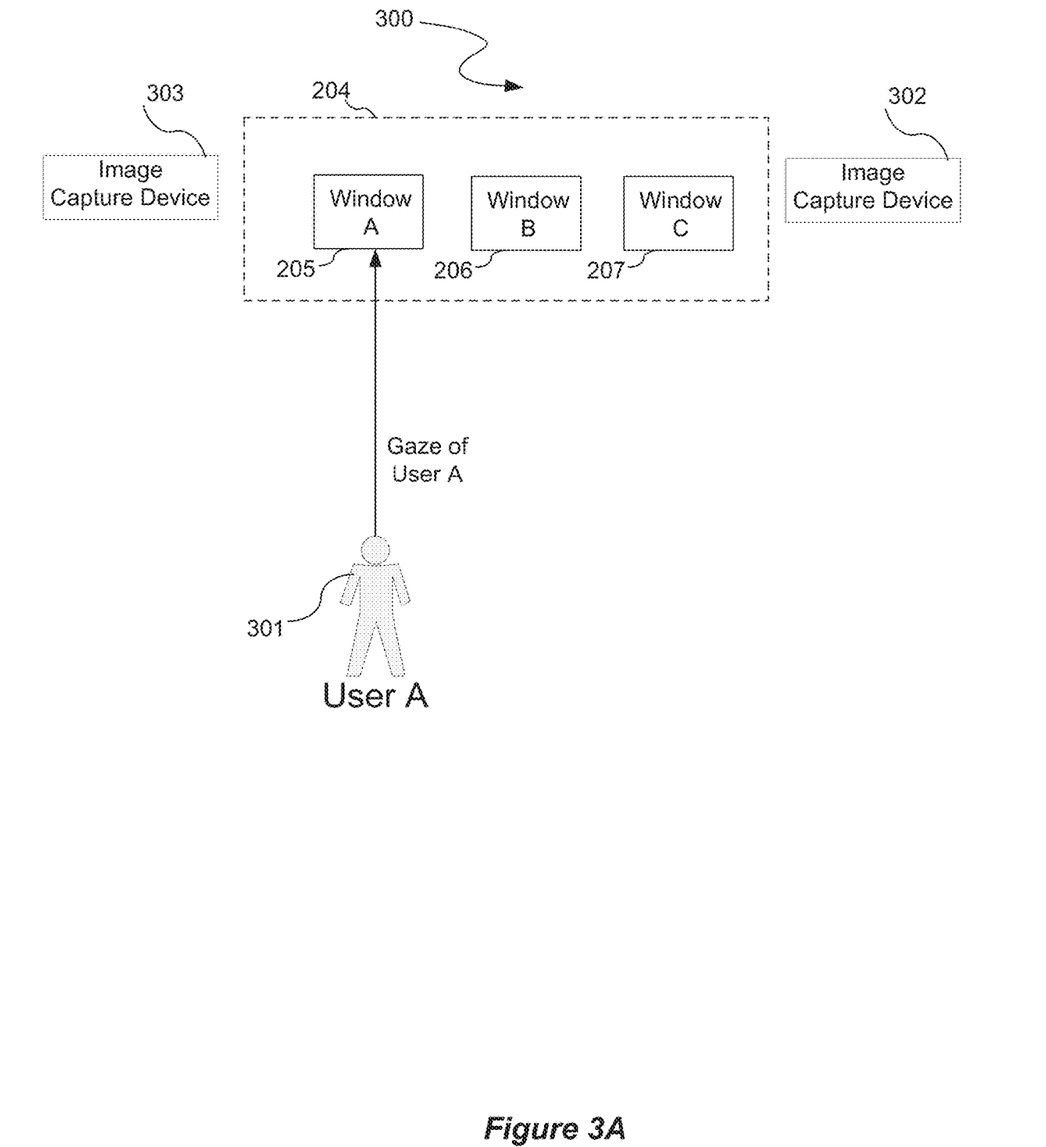
FIG. 3A illustrates a configuration in which a first user is viewing the multi-window display configuration.
Figure 3B:
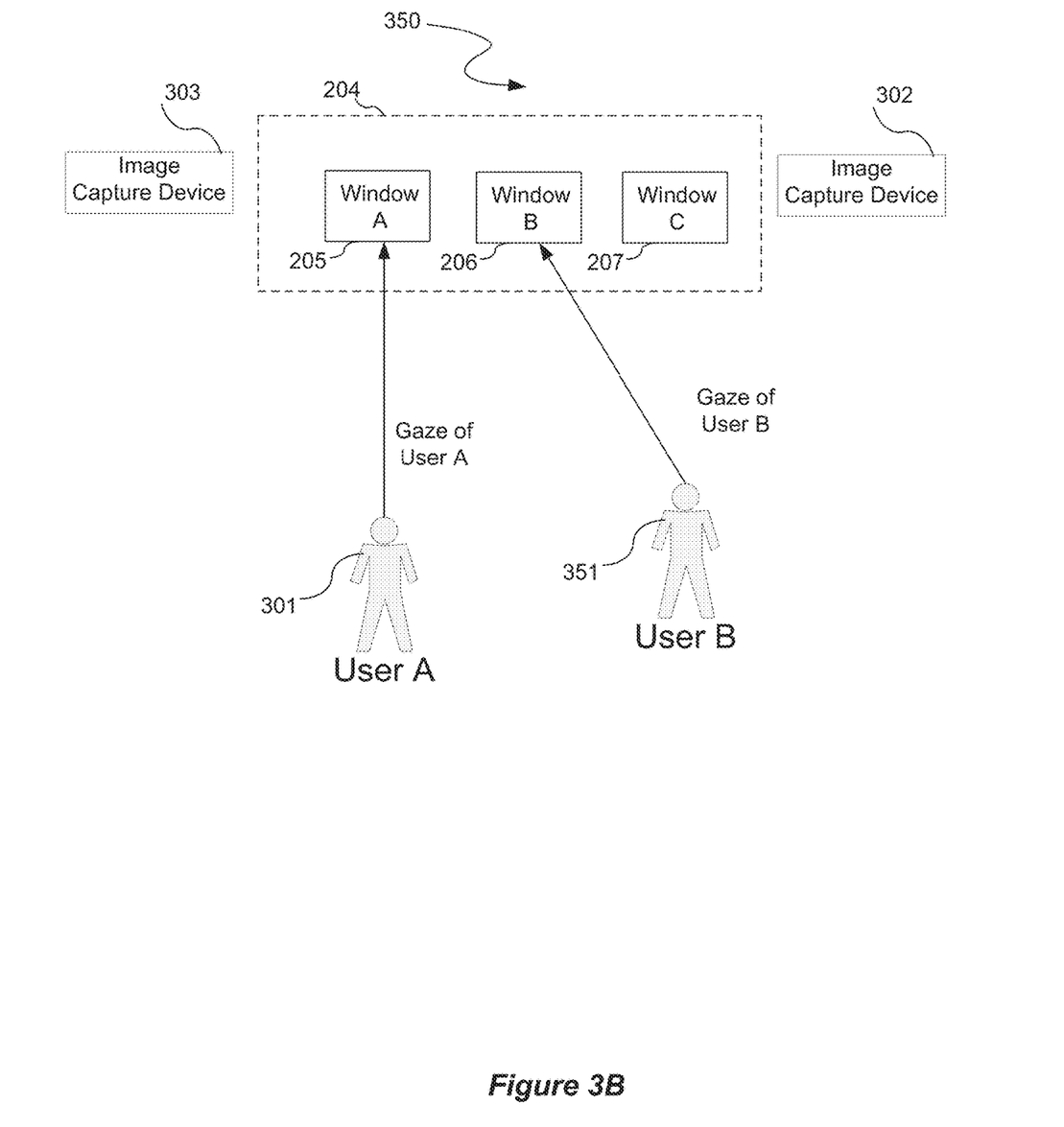
FIG. 3B illustrates a configuration in which the first user and a second user are viewing the multi-window display configuration.
Figure 3C:
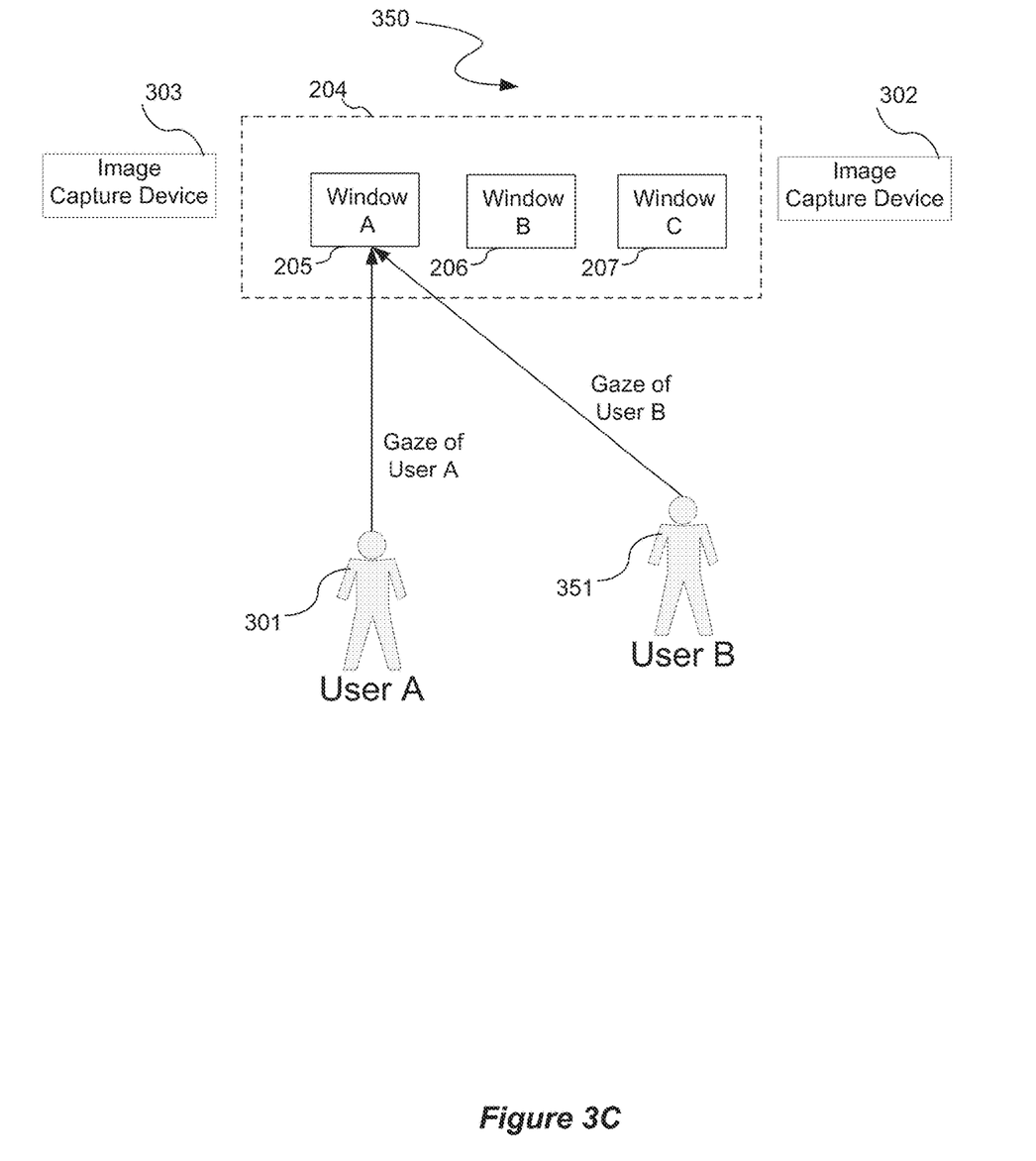
FIG. 3C illustrates the first user and the second user viewing the same window in the multi-window display configuration.

FIGS. 3A-3C illustrate examples of various quantities of users viewing the multi-window display configuration 204. FIG. 3A illustrates a configuration 300 in which a first user 301 is viewing the multi-window display configuration 204. In one aspect, the gaze tracking system 209 illustrated in FIG. 2 may have one or more integrated sensors that sense the gaze of the first user 301. For instance, the one or more integrated sensors may be image capture devices 302 and 303. The image capture devices 302 and 303 may be positioned in proximity to the multi-window display configuration 204 so that the image capture devices 302 and 303 may capture images of the first user 301, e.g., eyes, head position, etc., for the purpose of gaze determination. In another aspect, the gaze tracking system 209 may be in operable communication with one or more sensors that are distinct from the gaze tracking system 209. The gaze tracking system 209 uses the gaze tracking data in FIG. 3A to determine that the gaze of the first user 301 is directed toward the window 205.

FIG. 3B illustrates a configuration 350 in which the first user 301 and a second user 351 are viewing the multi-window display configuration 204. The image capture devices 302 and 303 capture images of the first user 301 and the second user 351 for identification purposes. For instance, a facial recognition system can be used as part of the gaze tracking system 209 illustrated in FIG. 2 to identify which user is gazing at which window of the multi-window display configuration 204. Therefore, the users 301 and 351 can move within the image capture range of the image capture devices 302 and 303 while being tracked for gaze determination purposes. The gaze tracking system 209 uses the gaze tracking data to determine that the gaze of the first user 301 is directed toward the window 205 and that the gaze of the second user 351 is directed toward the window 206.

FIG. 3C illustrates the first user 301 and the second user 351 viewing the same window in the multi-window display configuration 204. For example, the gaze tracking system 209 illustrated in FIG. 2 may determine that the first user 301 and the second user 351 are gazing at the window 205. In other words, the window 205 is providing content that is of more interest to the first user 301 and the second user 351 than the remaining windows 206 and 207.

The gaze of the one or more users as illustrated in FIGS. 3A-3C and the one or more windows coinciding with that gaze are used as gaze tracking data by the gaze tracking system 209. The streaming device 100 receives the gaze tracking data from the gaze tracking system and determines, e.g., via the media player 208, whether or not to modify one or more attributes of the one or more windows 205, 206, and 207. For example, the window 205 illustrated in FIG. 3C may have a corresponding attribute that is enhanced by the media player 208 illustrated in FIG. 2 as a result of multiple users 301 and 351 gazing at that particular window 205. As another example, the remaining windows 206 and 207 may have a corresponding attribute that is diminished by the media player 208 illustrated in FIG. 2 as a result of multiple users 301 and 351 gazing at window 205 rather than windows 206 and 207.

In one aspect, the streaming device 100 illustrated in FIG. 1 analyzes the gaze tracking data to determine if the amount of time that a user is viewing a particular window exceeds a particular time threshold so that a quick glance from one window to another window by a user may not result in a modification of a window attribute. In another aspect, the streaming device 100 determines window attribute modification based upon a gaze of a user without a time threshold determination.

As the one or more users change gaze, the streaming device 100 can vary the corresponding window attributes. For instance, the gaze tracking system 209 can determine if the first user 301 and the second user 351 have changed their gaze from the window 205 to the window 206. The streaming device 100, e.g., via the media player 208, can then modify the window attribute of the window 206 so that more computing resources are allocated to the window 206 to provide an enhanced viewing and/or listening experience for the users 301 and 351 viewing the second window 206. Further, the streaming device 100 can modify the window attribute of the window 205 to diminish the amount of computing resources used for that window to have a minimum allocation of computing resources for efficiency purposes.

In an alternative aspect, the gaze tracking system 209 performs an analysis of the gaze tracking data that includes instructions or recommendations for the media player 208 to adapt a window attribute. For instance, the gaze tracking system 209 may determine that the gaze of the user is directed toward a particular window and provide a recommendation to the media player 208 to enhance a window attribute of that window.

Figure 4A:
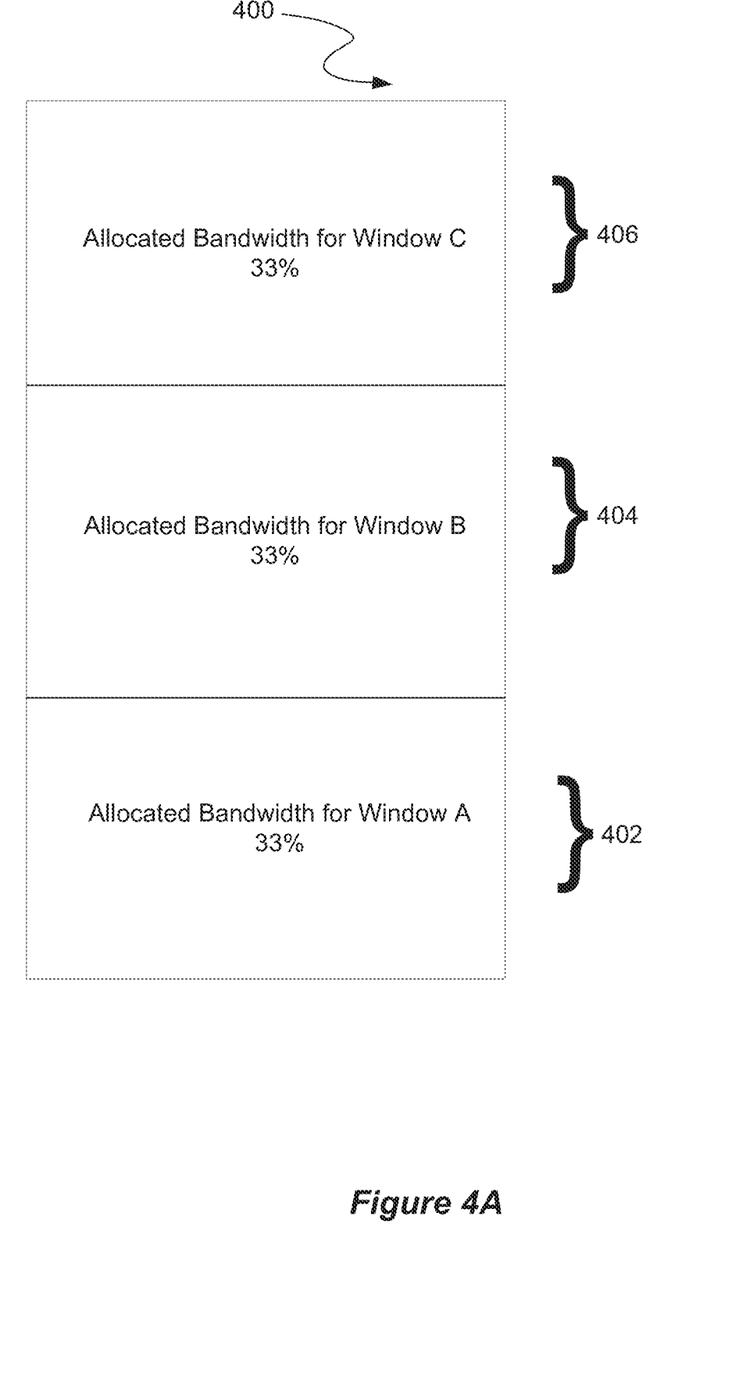
FIG. 4A provides an example of a bandwidth data structure that may be modified based upon sensed gaze tracking data.
Figure 4B:
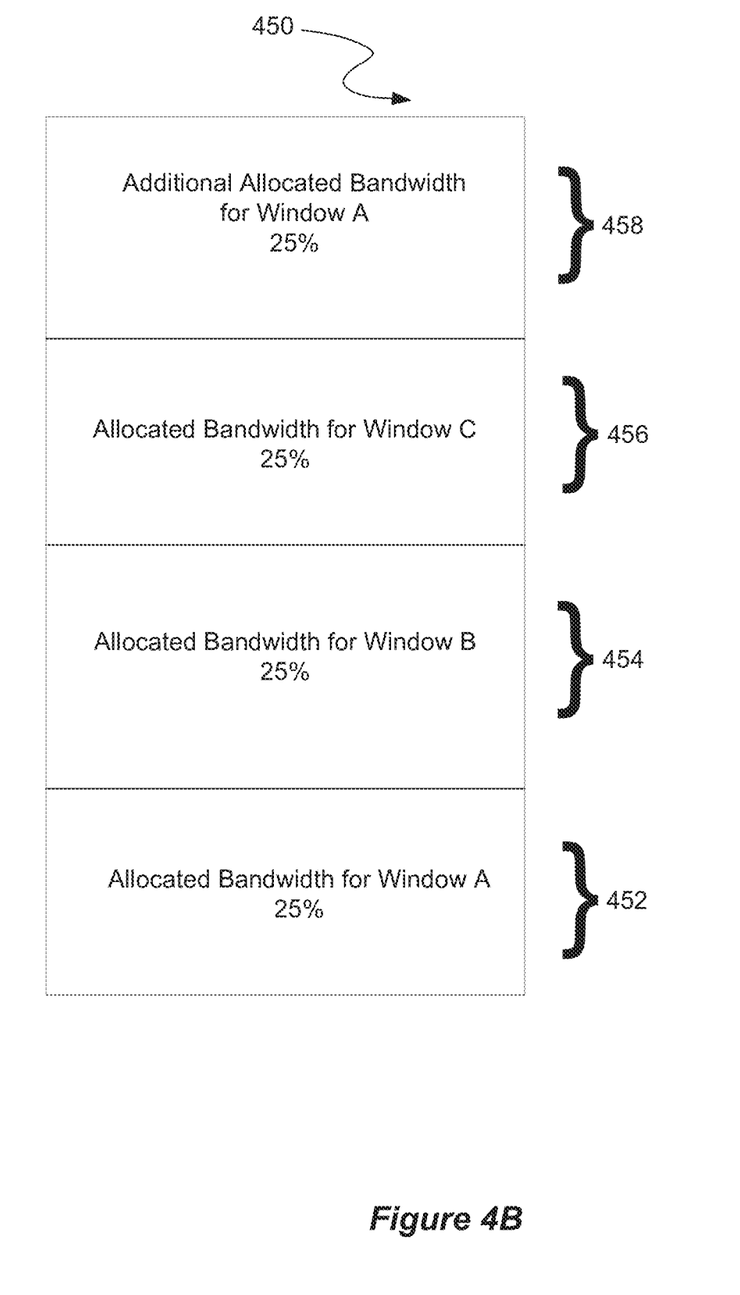
FIG. 4B provides an example of a bandwidth data structure that has been modified based upon sensed gaze tracking data.

Various window attributes such as bitrate, window dimensions, window location, and/or display of supplemental content may be modified based upon the sensed gaze tracking data. FIGS. 4A and 4B provide examples of bandwidth allocations that are modified based upon the sensed gaze tracking data. FIG. 4A provides an example of a bandwidth data structure 400 that may be modified based upon sensed gaze tracking data. The bandwidth data structure 400 is a data structure that may be stored on the streaming device 100 illustrated in FIG. 1 or a data storage device with which the streaming device 100 is in operable communication. The bandwidth data structure 400 illustrated in FIG. 4A allocates content data for display by each of the windows 205, 206, and 207 in the multi-window display configuration 204 illustrated in FIG. 3C. Further, the bandwidth data structure 400 has a bandwidth allocation 402 of thirty three percent for the window 205, a bandwidth allocation 404 of thirty three percent for the window 206, and a bandwidth allocation 406 of thirty three percent for the window 207.

For instance, the allocations illustrated in FIG. 4A may provide an allocation for each of the windows 205, 206, and 207 for an amount of bandwidth so that the windows 205, 206, and 207 can each display at least a minimal quality version of content independent of gaze determination to provide an acceptable content consumption experience for the user. For instance, the allocations 402, 404, and 406 for each of the windows 205, 206, and 207 may allow the windows 205, 206, and 207 to each display Standard Definition ("SD") content.

FIG. 4B provides an example of a bandwidth data structure 450 that has been modified based upon sensed gaze tracking data. The bandwidth data structure 450 is a data structure that may be stored on the streaming device 100 illustrated in FIG. 1 or a data storage device with which the streaming device 100 is in operable communication. The bandwidth data structure 450 illustrated in FIG. 4B allocates content data for display by each of the windows 205, 206, and 207 in the multi-window display configuration 204 illustrated in FIG. 3C subsequent to window attribute modification. For example, the gaze tracking data may indicate coordinates that coincide with the users 301 and 351 staring at the window 205. The media player 208 then modifies the window attribute of the window 205 to provide additional bandwidth to that window. The media player 208 may also modify the window attributes of the windows 206 and 207 to diminish the available bandwidth of those windows to acceptable user experiences to provide the additional bandwidth to the window 205. For example, the bandwidth data structure 450 may have a bandwidth allocation 452 of twenty five percent for the window 205, a bandwidth allocation 454 of twenty five percent for the window 206, a bandwidth allocation 456 of twenty five percent for the window 207, and an additional bandwidth allocation 458 of twenty five percent for the window 205. The total bandwidth allocations 452 and 458 may allow for the window 205 to provide an enhanced viewing experience, e.g., display of High Definition ("HD") or High Dynamic Range ("HDR") content.

The streaming device 100 determines its bandwidth availability for a window, e.g., window 205, and selects a corresponding bitrate from the received manifest file 210 as illustrated in FIG. 2. The streaming device 100 may then send the selected bitrate with the request for the content 203, which is to be displayed on the window 205, to the CDN 211. The CDN 211 then obtains the content 203 according to the selected bitrate and sends that content 203 based upon that selected bitrate to the streaming device 100 for display on the window 205.

The determination of the amount of additional bandwidth that is allocated to a window at which one or more users is gazing may be based upon a variety of factors. In one aspect, the quantity of users that are viewing the particular window may be a factor. That quantity may be expressed as a number. Alternatively, that quantity may be expressed as a percentage with respect to a total quantity of users detected within range of the one or more sensors, e.g., image capture devices 302 and 303. In another aspect, the dimensions of the window at which the users are gazing may be a factor in addition to the quantity of users. For instance, a certain window dimension threshold may be established at which content quality may or may not be pertinent. For example, a user may not be able to observe a difference between SD quality and HD quality of displayed content in a window that has dimensions less than the window dimension threshold. Therefore, the media player 208 illustrated in FIG. 2 may not modify the content quality of the window 205 based upon two users 301 and 351 viewing a window 205 that is less than the window dimension threshold. A formula that uses the ratio of the bandwidth used by each window divided by the dimensions of that window can be used to determine the amount of additional bandwidth, if any, that is provided to each window.

Figure 5:
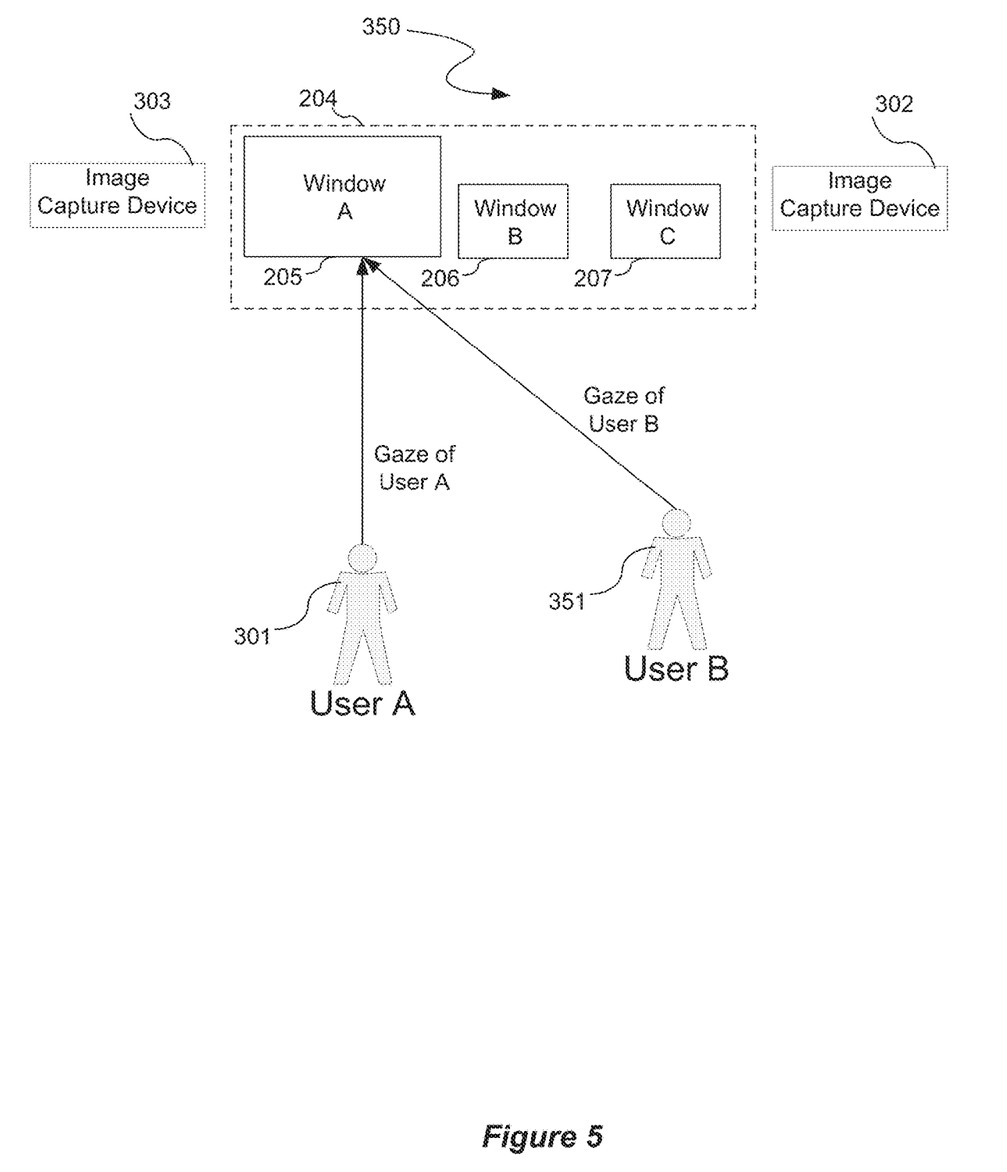
FIG. 5 provides an example of the attribute of window dimensions being modified based upon sensed gaze tracking data.

FIG. 5 provides an example of the attribute of window dimensions being modified based upon gaze tracking data. For example, the window 205 illustrated in FIG. 3C may have dimensions that are increased based upon gaze tracking data indicating that the gazes of the first user 301 and the second user 351 are directed toward the window 205. Alternatively or additionally, the volume of the audio portion of the stream sent to the window 205 may be increased based upon the gaze tracking data indicating that the gazes of the first user 301 and the second user 351 are directed toward the window 205.

Further, the remaining windows 206 and 207 may have attributes that are modified or diminished as a result of the gaze tracking data indicating that the gazes of the first user 301 and the second user 351 are directed toward the window 205 instead of the windows 206 and 207. For example, the content that is being displayed on the remaining windows 206 and 207 may be removed and replaced with supplemental content to the content being displayed by the window 205, e.g., statistics, additional information, etc., pertaining to the content that is being displayed by the window 205. As another example, the dimensions of the remaining windows 206 and 207 may be diminished.

Although the examples are directed toward modification of a particular attribute, multiple attributes may be simultaneously modified. For instance, the window 205 may have a bandwidth attribute enhanced to receive high quality content and a window attribute enhanced to have larger dimensions as a result of the first user 301 and the second user 351 gazing at the window 205.

The examples in the present disclosure are provided only for ease of illustration. Different quantities of users, windows, display devices, etc. may be used with the configurations provided for in the present disclosure.

Figure 6:
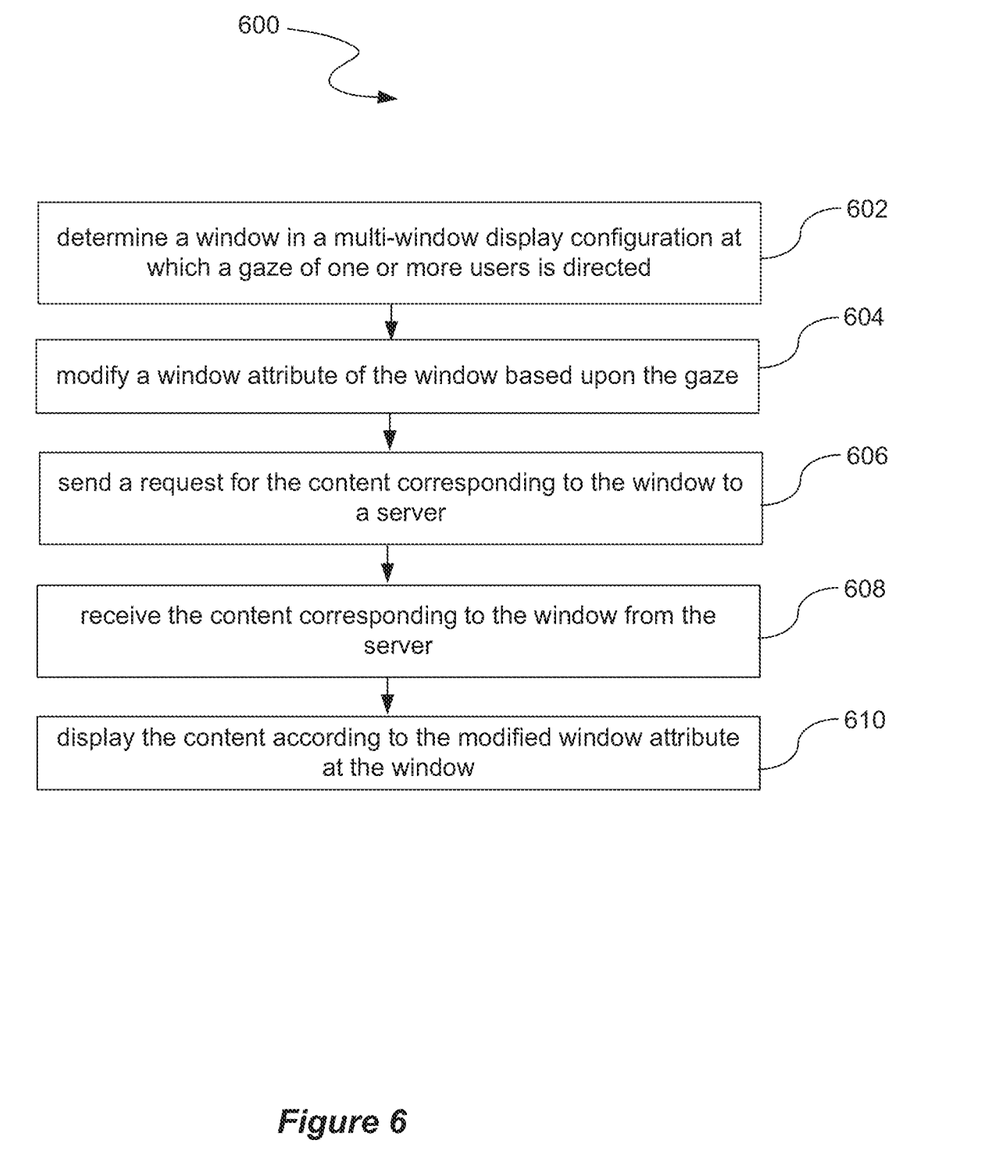
FIG. 6 illustrates a process that is used for adapting a window attribute in the multi-display configuration illustrated in FIG. 2.

FIG. 6 illustrates a process 600 that is used for adapting a window attribute in the multi-display configuration 204 illustrated in FIG. 2. At a process block 602, the process determines a window in the multi-window display configuration 204 at which a gaze of one or more users is directed. The multi-window display configuration has a plurality of windows that is each configured to display corresponding content. Further, at a process block 604, the process 600 modifies a window attribute of the window based upon the gaze. In addition, at a process block 606, the process 600 sends a request for the content corresponding to the window to a server. At a process block 608, the process 600 receives the content corresponding to the window from the server. Further, at a process block 610, the process 600 displays the content corresponding to the server according to the modified window attribute at the window.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A display system comprising:
one or more processing elements comprising a shared amount of computing resources dedicated to the display system;
a multi-window display having a plurality of windows each configured to display respective content, the plurality of windows including a first window and at least one additional window; and
one or more computer-readable non-transitory storage media, the storage media encoded with instructions that when executed, cause the one or more processing elements to perform operations comprising:
displaying the respective content for the plurality of windows, wherein the respective content is received from a server,
determining that a gaze of a user is directed at the first window,
modifying a window attribute of the first window based upon the gaze,
generating a modified window attribute based on the modification, wherein the modified window attribute comprises at least one of a bitrate of the respective content, a window dimension of the first window, an audio volume corresponding to the first window, or the respective content displayed by the first window,
allocating the shared amount of computing resources between the first window and the at least one additional window by reducing computing resources of the shared amount of computing resources allocated to the at least one additional window by an amount and increasing computing resources of the shared computing resources allocated to the first window by the amount, and
displaying the respective content according to the modified window attribute at the first window.

2. The display system of claim 1, wherein the amount of the shared amount of computing resources is based on the modified window attribute.

3. The display system of claim 1, wherein:
the at least one additional window comprises a second window; and
the instructions that when executed, cause the one or more processing elements to perform operations comprising:
tracking a plurality of gazes directed at the multi-window display, wherein the plurality of gazes includes the gaze, and each of the plurality of gazes is identified as corresponding to one of a plurality of users;
determining that a majority of the plurality of gazes is directed toward the first window;
determining that a minority of the plurality of gazes, including at least one gaze of the plurality of gazes, is directed toward the second window, wherein the modified window attribute is based on the determination that the majority of the plurality of gazes is directed toward the first window.

4. The display system of claim 1, further comprising a gaze-tracking device that determines that the gaze of the user is directed at the first window.

5. The display system of claim 4, wherein:
the gaze-tracking device comprises one or more image capture devices configured to capture at least one image of the user; and
the at least one image is used to determine the plurality of gazes.

6. The display system of claim 1, further comprising a plurality of display devices that each display at least one of the plurality of windows, the plurality of display devices being in operable communication with the server.

7. The display system of claim 1, wherein:
the at least one additional window comprises a second window;
the modified window attribute comprises the bitrate of the respective content; and
the instructions that when executed, cause the one or more processing elements to perform operations comprising:
requesting the respective content from the server at a first bitrate for the first window, and
requesting the respective content from the server at a second bitrate for the second window, wherein the second bitrate is less than the first bitrate.

8. The display system of claim 1, wherein the multi-window display comprises a projection device configured to project the respective content onto a projection surface.

9. The display system of claim 1, wherein:
the at least one additional window comprises a second window;
the instructions that when executed, cause the one or more processing elements to perform operations comprising determining that the gaze of the user is not directed at the second window; and
the modification includes at least one of increasing a dimension of the first window or decreasing a dimension of the second window.

10. The display system of claim 1, wherein:
the at least one additional window comprises a second window;
the instructions that when executed, cause the one or more processing elements to perform operations comprising:
determining that the gaze of the user is not directed at the second window;
removing the respective content from the second window; and
displaying supplemental content on the second window.

11. The display system of claim 10, wherein the supplemental content pertains to the respective content.

12. A method comprising:
   displaying respective content for a plurality of windows in a multi-window display, wherein the respective content is received from a server, wherein the plurality of windows includes a first window and at least one additional window;
   determining, by one or more processing elements, that a gaze of a user is directed at the first window;
   modifying, by the one or more processing elements, a window attribute of the first window based upon the gaze;
   generating, by the one or more processing elements, a modified window attribute based on the modification, wherein the modified window attribute comprises at least one of a bitrate of the respective content, a window dimension of the first window, an audio volume corresponding to the first window, or the respective content displayed by the first window;
   allocating a shared amount of computing resources between the first window and the at least one additional window by reducing computing resources of the shared amount of computing resources allocated to the at least one additional window by an amount and increasing computing resources of the shared amount of computing resources allocated to the first window by the amount; and
   displaying, by the one or more processing elements, the respective content according to the modified window attribute at the first window.

13. The method of claim 12, wherein the amount of the shared amount of computing resources is based on the modified window attribute.

14. The method of claim 12, wherein the at least one additional window comprises a second window, the method further comprising:
   tracking, by the one or more processing elements, a plurality of gazes directed at the multi-window display, wherein each of the plurality of gazes is identified as corresponding to one of a plurality of users;
   determining, by the one or more processing elements, that a majority of the plurality of gazes is directed toward the first window;
   determining, by the one or more processing elements, that a minority of the plurality of gazes, including at least one gaze of the plurality of gazes, is directed toward the second window, wherein the modified window attribute is based on the determination that the majority of the plurality of gazes is directed toward the first window.

15. The method of claim 12, further comprising determining that the gaze of the user is directed at the first window by a gaze-tracking device.

16. The method of claim 15, wherein:
   the gaze-tracking device comprises one or more image capture devices configured to capture at least one image of the user; and
   the at least one image is used to determine the plurality of gazes.

17. The method of claim 12, further comprising a plurality of display devices that each display at least one of the plurality of windows, the plurality of display devices being in operable communication with the server.

18. The method of claim 12, wherein:
   the modified window attribute comprises the bitrate of the respective content;
   the at least one additional window comprises a second window; and
   the method further comprises:
      requesting, by the one or more processing elements, the respective content from the server at a first bitrate for the first window, and
      requesting, by the one or more processing elements, the respective content from the server at a second bitrate for the second window, wherein the second bitrate is less than the first bitrate.

19. The method claim 18, wherein the amount of the shared amount of computing resources is based on at least one of the first bitrate or the second bitrate.

20. A system comprising:
   a display configured to display a plurality of windows, the plurality of windows including a first window and at least one additional window;
   a server;
   a streaming device configured to:
      display respective content for the plurality of windows, wherein the respective content is received from the server,
      receive the respective content from the server,
      determine that a gaze of a user is directed at the first window,
      modify a window attribute of the first window based upon the gaze,
      generate a modified window attribute based on the modification, wherein the modified window attribute comprises at least one of a bitrate of the respective content, a window dimension of the first window, an audio volume corresponding to the first window, or the respective content displayed by the first window,
      allocate a shared amount of computing resources between the first window and the at least one additional window by reducing computing resources of the shared amount of computing resources allocated to the at least one additional window by an amount and increasing computing resources of the shared amount of computing resources allocated to the first window by the amount; and
      cause the display to display the respective content according to the modified window attribute at the window.

21. The system of claim 20, wherein the amount is based on the modified window attribute.

22. The system of claim 20, wherein:
   the at least one additional window comprises a second window; and
   the streaming device is further configured to:
      track a plurality of gazes directed at the multi-window display, wherein the plurality of gazes includes the gaze, and each of the plurality of gazes is identified as corresponding to one of a plurality of users;
      determine that a majority of the plurality of gazes is directed toward the first window; and
      determine that a minority of the plurality of gazes, including at least one gaze of the plurality of gazes, is directed toward the second window, wherein the modified window attribute is based on the determination that the majority of the plurality of gazes is directed toward the first window.

* * * * *